United States Patent [19]
Hartung et al.

[11] 4,024,576
[45] May 17, 1977

[54] METHOD AND APPARATUS FOR SCRAMBLING AND UNSCRAMBLING COMMUNICATION SIGNALS

[75] Inventors: Albert F. Hartung, Woodland Hills; Frank W. Lehan, Santa Barbara; Charles T. Barooshian, Pacific Palisades; Edward J. Zacharski, Malibu, all of Calif.

[73] Assignee: System Development Corporation, Santa Monica, Calif.

[22] Filed: Sept. 2, 1975

[21] Appl. No.: 609,577

Related U.S. Application Data

[62] Division of Ser. No. 388,439, Aug. 15, 1973, Pat. No. 3,919,462.

[52] U.S. Cl. ............................................. 358/124
[51] Int. Cl.² ......................................... H04N 1/44
[58] Field of Search ..................... 178/5.1, DIG. 13

[56] References Cited

UNITED STATES PATENTS

| | | | |
|---|---|---|---|
| 3,081,377 | 3/1963 | Watters | 178/5.1 |
| 3,440,338 | 4/1969 | Walker | 178/5.1 |
| 3,527,877 | 9/1970 | Walker | 178/5.1 |
| 3,777,053 | 12/1973 | Wittig et al. | 178/5.1 |
| 3,789,131 | 1/1974 | Harney | 178/5.1 |
| 3,801,732 | 4/1974 | Reeves | 178/5.1 |
| 3,824,332 | 7/1974 | Horowitz | 178/5.1 |
| 3,885,089 | 5/1975 | Callais et al. | 178/5.1 |

*Primary Examiner*—Maynard R. Wilbur
*Assistant Examiner*—S. C. Buczinski
*Attorney, Agent, or Firm*—Fulwider, Patton, Rieber, Lee & Utecht

[57] ABSTRACT

Method and apparatus for scrambling and unscrambling television video and audio signals in a subscription television system in which program selections of subscribers are known at a central transmitting site, and control signals encoded into vertical blanking intervals of the video signals are addressed to receivers authorized to receive unscrambled transmissions, to selectively control unscrambling at those receivers. In an unscrambler at each subscriber's receiver, the control signals are decoded, and, if addressed to the particular subscriber's receiver, operate to enable or disable the unscrambler, or to frequently vary its mode of operation, thereby greatly increasing the security of the system and deterring viewing of scrambled transmissions. Video scrambling and unscrambling are effected by inversion of selected horizontal lines of a transmitted television picture, and a technique is disclosed for inversion or non-inversion in a preselected sequence, as determined by synchronized logic at the receivers and the transmitting site.

11 Claims, 14 Drawing Figures

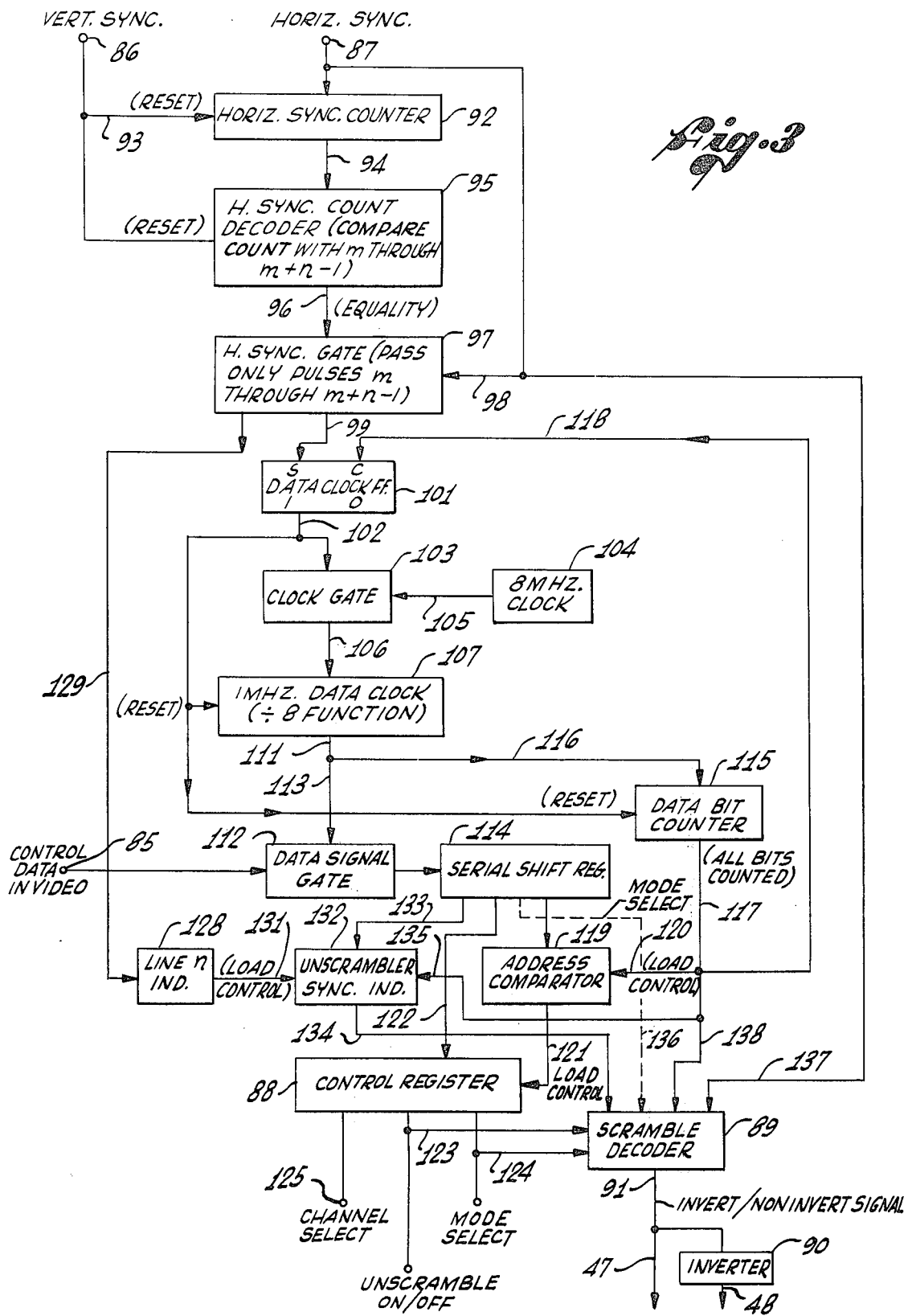

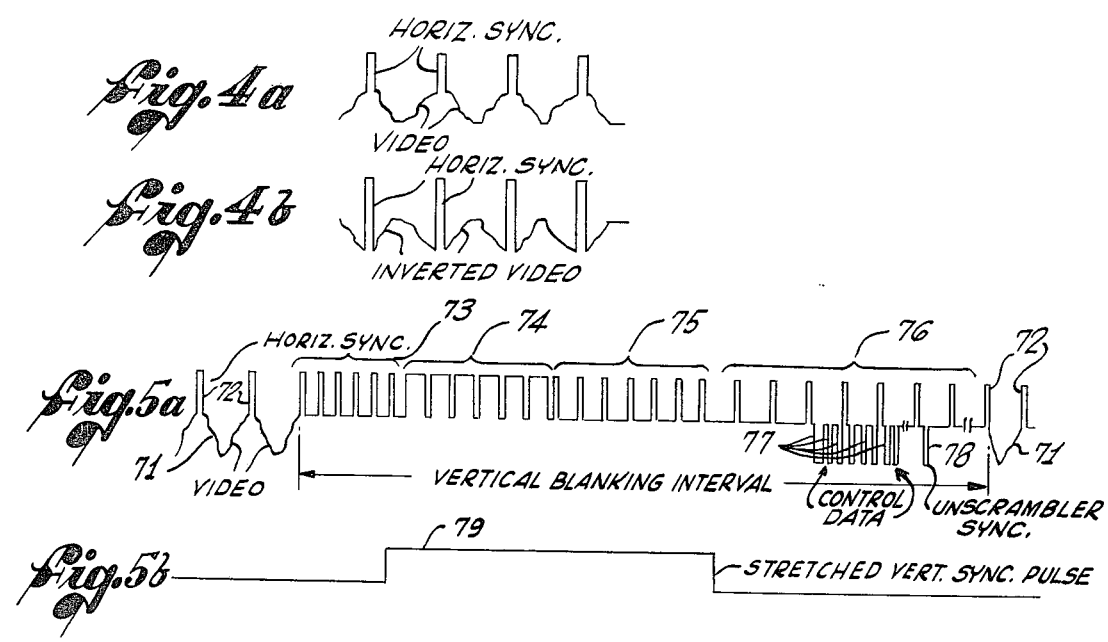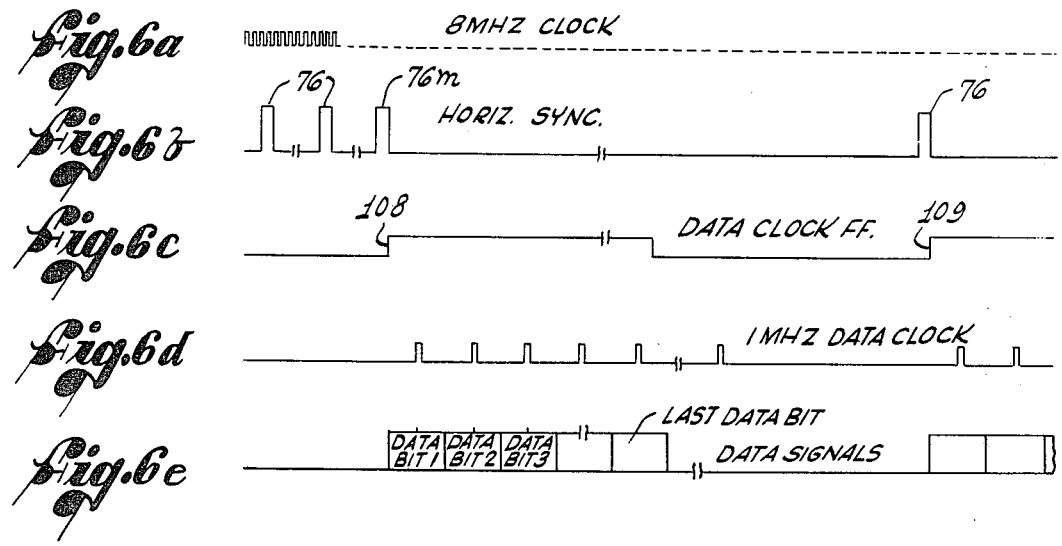

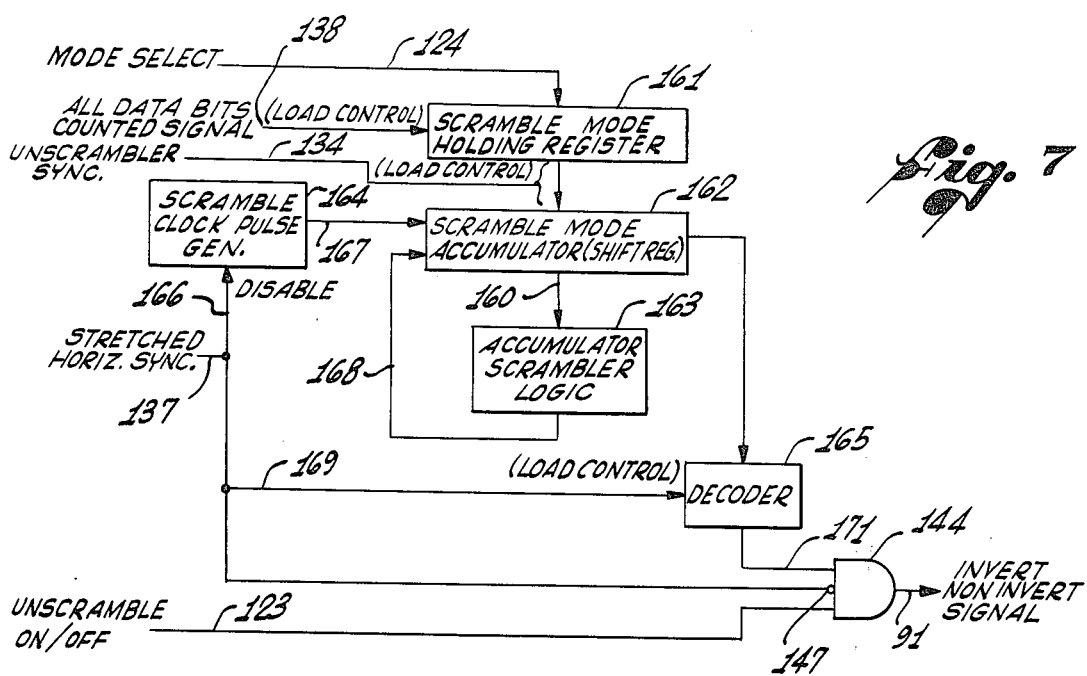
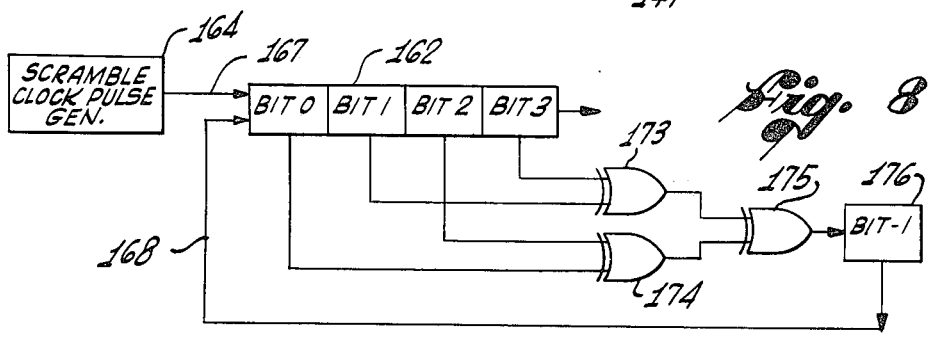

METHOD AND APPARATUS FOR SCRAMBLING AND UNSCRAMBLING COMMUNICATION SIGNALS

This is a division, of application Ser. No. 388,439, filed Aug. 15, 1973, now Pat. No. 3,919,462.

BACKGROUND OF THE INVENTION

This invention relates generally to techniques for scrambling and unscrambling television signals, and, more particularly, to improved scrambling and unscrambling techniques applied to a subscription television system controllable by a central computer.

In subscription television, or "pay-T.V." systems, subscribers select programs that they wish to view, and pay to have those programs transmitted to their television receivers, usually along a coaxial cable. One requirement for such systems is that the transmitted signals should be unintelligible to non-subscribers or to subscribers who have not paid for a particular program. Various methods have been suggested for scrambling video signals, such as by inserting time delays, or by inverting portions of the video signals so that white and black images are reversed on portions of the television screen.

The success of a particular scrambling technique depends, first of all, on whether a program is sufficiently scrambled to deter unauthorized viewers from watching it in a scrambled condition, and secondly, on how difficult it is for a resouceful viewer to circumvent the protection provided by the scrambling techniques.

Some prior systems provide for limited variation of the mode of scrambling and unscrambling, these generally requiring the insertion of a coded card, or the like, to correctly unscramble the signals. However, there has long existed a need for a scrambling technique in which security can be maximized by rapidly and automatically varying the scrambling mode, without the need for manual intervention by the subscribers, and which will effectively deter viewers of the scrambled television picture. The present invention fulfills this need.

SUMMARY OF THE INVENTION

The present invention resides in a method and apparatus for scrambling and unscrambling television video signals, wherein the mode of scrambling and unscrambling may be varied automatically and continually in order to increase the security of the system and to deter unauthorized viewers.

In a presently preferred embodiment of this invention, video signals are scrambled by the inversion of some of the horizontal lines making up a television picture. This has the disconcerting effect of reversing the black and white portions of the inverted lines, in a black and white picture, or inverting the color spectrum in a color picture. The scrambling mode at any instant may be such that, for example, the inverted lines form patterns of regularly or irregularly spaced bars across the picture, and the bars may be made to roll up or down. Furthermore, the scrambling mode may be changed at a rapid rate, producing an almost infinite variety of moving patterns of inverted lines on the screen if the signals are not unscrambled prior to video display.

To scrambled video signals produced by inversion of some of the horizontal picture lines are unscrambled at each authorized receiver by an unscrambler functionally complementary to scrambling means at the transmitter. In the preferred embodiment, control signals are encoded into a conventionally formed, composite video and synchronization signal, specifically in those portions of the video and synchronization signal relating to vertical blanking intervals, during which a conventional television picture tube has its electron beam returned to the top of the tube after scanning a complete field of the picture.

In the embodiment described herein, the decision whether or not to invert a particular line being scrambled or unscrambled is derived from the contents of a register, which is itself scrambled in a predetermined manner while the previous line is being transmitted or received. Different scrambling modes may be established by storing different starting patterns in the register.

More specifically, the method of the invention includes the steps of receiving and decoding unscrambler mode selection signals encoded from time to time in vertical blanking intervals of the video signals, storing these signals in register means, and selectively inverting the video signals in accordance with a mode determined by the mode selection signals. The step of selectively inverting includes scrambling the signals stored in the register means according to a predetermined pattern, deriving an inversion indicator signal from the scrambled stored signals, and inverting the video signals only when the inversion indicator signal is in a particular state. In the specific embodiment described herein, the register means is a shift register, and scrambling is effected by shifting the contents of the register a predetermined number of times between consecutive horizontal synchronization pulses, and performing successive exclusive OR functions on the digits of the register to obtain a single digit result. The method may also include receiving and decoding unscrambler synchronization signals, and resetting the shift register to a starting value in response thereto. The novel apparatus of the invention includes corresponding means for performing the aforedescribed method steps.

It will be appreciated from the foregoing that the present invention significantly advances the state of the art of scrambling and unscrambling television video signals in subscription television systems. In particular, since the invention is operable to vary the scrambling mode rapidly and automatically, it provides greatly increased security from unauthorized unscrambling of signals intended only for certain subscribers, without the necessity of subscriber identification by manual means. Moreover, the scrambling mode may be selected and varied to deter most unauthorized viewers from watching the scrambled video patterns. Other aspects and advantages of the invention will become apparent from the following more detailed description taken in conjunction with the accompanying drawings.

BRIEF DESCRIPTION OF THE DRAWINGS

FIG. 3 is a more detailed block diagram of unscrambler logic employed in the unscrambler of FIG. 2;

FIG. 4a is a time-amplitude graph of a conventional, composite video and synchronization signal;

FIG. 4b is a graph similar to that in FIG. 4a, in which the video signal portions have been inverted;

FIG. 5a is a time-amplitude graph of a composite video and synchronization signal, showing control signals encoded into the vertical blanking interval;

FIG. 5b is a time-amplitude graph of a "stretched" vertical synchronization pulse derived from the signal of FIG. 5a;

FIGS. 6a–e are time-amplitude graphs of various timing and data signals, and together comprise a timing diagram relating to the operation of the unscrambler logic of FIG. 3;

FIG. 7 is a block diagram illustrating a scramble decoder included in the unscrambler logic of FIG. 3, and embodying the present invention; and FIG. 8 illustrates, by way of example, one possible form of the accumulator scrambler logic included in the scramble decoder of FIG. 7.

DESCRIPTION OF THE PREFERRED EMBODIMENT

Figure 1:
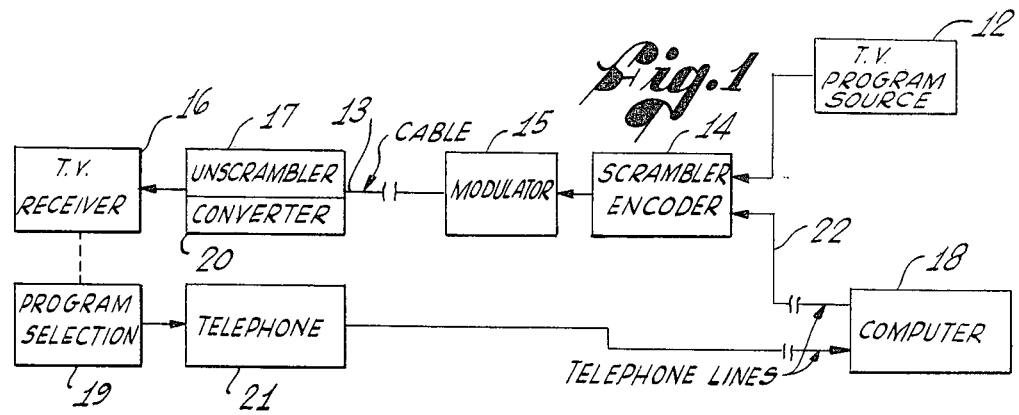
FIG. 1 is a block diagram showing the subsystem components of a subscription television system in which the invention might be used.

As shown in the drawings for purposes of illustration, the invention is particularly well suited for use in a computer controlled subscription television system, the principal components of which are shown in FIG. 1. In such a system, signals form a television program source 2, such as a television camera or a television network, are transmitted to paying subscribers, typically, but not necessarily, by means of a coaxial cable 13. In order to prevent non-subscribers and subscribers who have not paid for a particular program from receiving the transmission, the signals from the television program source 2 are processed by a scrambler-encoder 14, which modifies the signals in some fashion to make them unintelligible to an unauthorized receiver. A modulator 15 uses the signals from the scrambler-encoder 14 to modulate a high frequency carrier for transmission along the cable 13. The modulator 15 is conventional except that its audio portion is realigned to scramble audio signals by shifting the audio carrier and thereby increasing the frequency difference between the video and audio carriers.

Each subscriber to the system has a conventional television receiver 16, and is supplied with an unscrambler 17 connected between the cable 13 and the receiver. The unscrambler 17 may have associated with it a converter 20 for converting specially assigned carrier frequencies, used for transmission over the cable, to a frequency corresponding to an unused numbered channel to which the receiver 16 can be tuned. Although only one receiver 16 is shown in FIG. 1, it will be appreciated that, in general, a number of separate receivers will be connected to the cable 13.

In the system illustrated, a central computer 18 is used to maintain records of available programs and of programs selected by the subscribers. Each subscriber selects the programs he wishes to view (indicated by the block 19), and conveys his selections to the central computer 18 by means of a telephone 21. The selections may be communicated to the computer 18 directly by means of some digital attachment (not shown) acoustically coupled to the telephone 21, or may be input to the computer by an operator in voice communication with the subscribers. Alternatively, there may be a reverse communication path along the cable 13 to the computer 18, so that a subscriber may select programs by operating switches or buttons (not shown) at his television receiver 16. However the programs are selected is of little consequence so far as the present invention is concerned, so long as there is some means to determine which subscribers are authorized to receive various programs. The scrambler-encoder 14, which is also connected to the computer 18, typically by a telephone line 22, may then be directed to encode appropriate unscrambler control signals for transmission with the conventional television signals.

Figure 2:
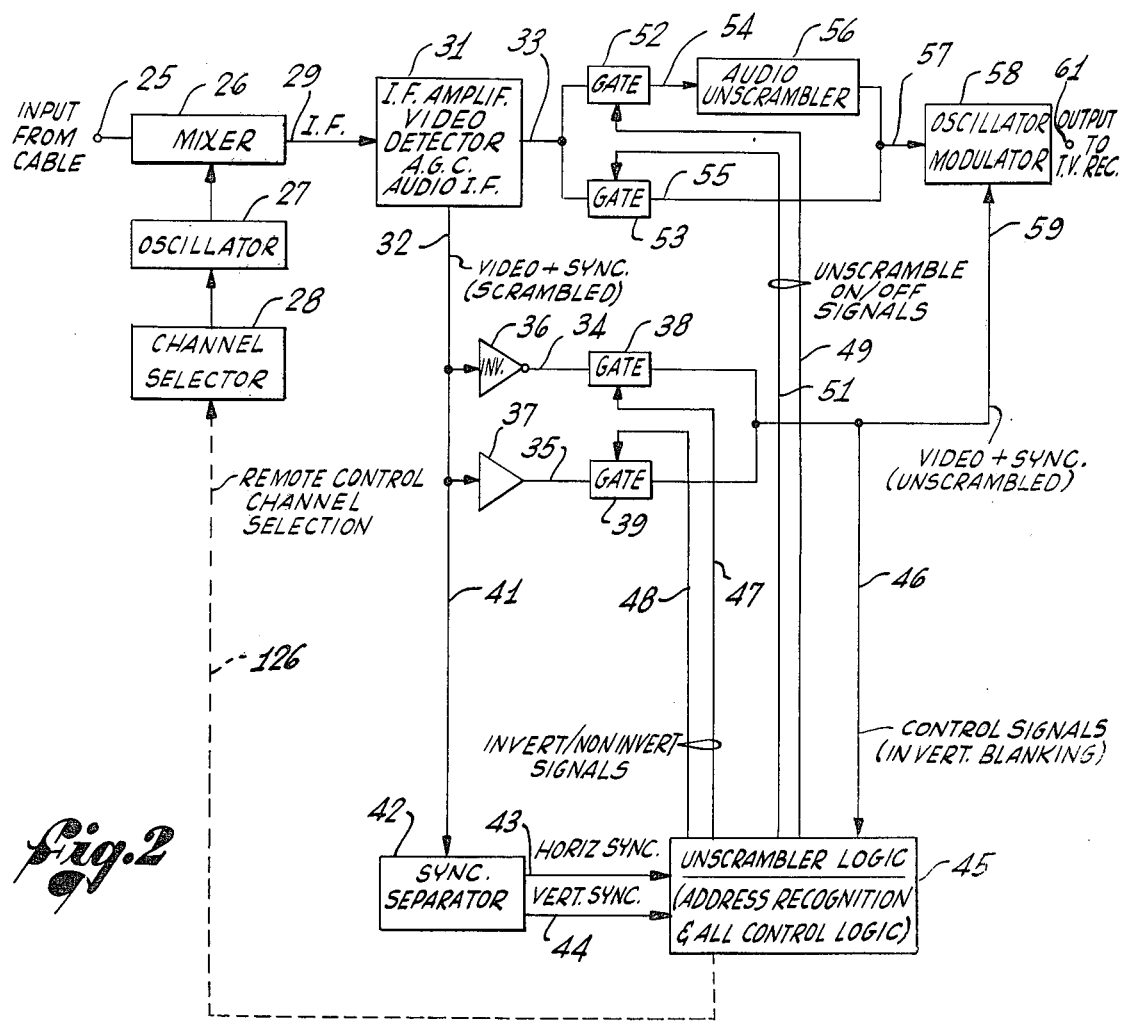
FIG. 2 is a block diagram showing an unscrambler which may be employed in the system of FIG. 1, and showing how the apparatus of the invention might be connected with the system.

The present invention is principally concerned with improved techniques employed in the scrambler-encoder 14 and the unscrambler 17, and FIG. 2 illustrates in block diagram form the unscrambler 17 used in a presently preferred embodiment of the invention. It will be appreciated, however, that, in systems involving signal scrambling and unscrambling, the techniques used in unscrambling are functionally complementary to those used in scrambling. Consequently, although only the unscrambler 17 is described in detail herein, it will be understood that complementary techniques are used in the scrambler-encoder 14, and that these techniques will be readily apparent to those of ordinary skill in the art.

As will be apparent from FIG. 2, many elements of the unscrambler 17 are conventional in the television electronics art, and these are described herein only for the purpose of illustrating the environment in which the improvements constituting the invention will operate. The scrambled television signals from the cable 13 (FIG. 1) are input to the unscrambler 17 through an input terminal 25 and processed by a conventional mixer 26 connected with a conventional oscillator 27 and channel selector 28. The output from the mixer 26 is an intermediate frequency (IF) signal, which, as shown by the line 29, is connected to conventional circuitry performing the functions shown in block 31, including IF amplification, video detection, automatic gain control, and audio IF amplification. As shown in FIG. 2, the output from these conventional circuits grouped in block 31 includes a composite video and synchronization signal, which is still in scrambled form, along line 32, and an audio IF signal, along line 33.

The scrambled video and synchronization signal on line 32 is gated through one of two parallel paths 34 and 35 including an inverting amplifier 36 and a non-inverting amplifier 37, respectively, and controlled by conventional gating circuits 38 and 39, respectively. When the gate 39 is open and the gate 38 is closed, the composite video and synchronization signal is not inverted and appears, for example, like the signal shown in FIG. 4a. However, when the gate 39 is closed and the gate 38 opened for the video portions of the composite signal, the video portions are inverted, as shown in FIG. 4b. The composite video and synchronization signal on line 32 is also input over line 41 to a synchronization separator 42, which uses techniques well known in the art to separate the conventional television synchronization signals from the composite signal, and to transmit these along lines 43 and 44 to unscrambler logic 45, the detail of which is central to this invention, and will be discussed herebelow in connection with FIG. 3.

The unscrambler logic 45 receives control signals encoded in the composite video and synchronization signal along line 46, and operates to generate two basic output control signals: an "invert" or "non-invert" signal on lines 47 and 48, respectively, connected to the gating circuits 38 and 39 to control inversion or non-inversion of the video signal, and an "unscramble on" or "off" signal on lines 49 and 51, respectively, connected to additional gating circuits 52 and 53, respectively, to control audio unscrambling. The audio IF signal on line 33 takes one of two parallel paths 54 and 55 as determined by the gating circuits 52 and 53, the path 54 passing through an audio unscrambler 56 before merging with the alternate path 55 and being input over line 57 to conventional oscillator and modulator circuits 58. The composite video and synchronization signal, as unscrambled under the control of the unscrambler logic 45, is also input to the oscillator and modulator 58, over line 59, and is there used, together with the audio signal input over line 57 to modulate a high frequency carrier signal in a conventional manner. The carrier signal is output from the unscrambler 17 to the receiver 16 through an output terminal 61.

It has been proposed that subscription television systems be assigned so-called "mid-band" frequencies between the frequencies assigned to numbered channels in the very high frequency (VHF) range. If this were the case, and if the receiver 16 (FIG. 1) were not equipped to receive these mid-band channels, the unscrambler illustrated in FIG. 2 would also operate as a frequency converter, i.e., it would be tuned to receive one of the mid-band frequencies, while the oscillator and modulator 58 would be tuned to output a signal at a frequency corresponding to an unused numbered channel, to which the receiver 16 could be tuned to receive the mid-band channels.

The techniques of scrambling and unscrambling television signals as thus far greatly described with reference to FIGS. 1 and 2, while not particularly well known, are not believed to be novel, but are believed to require some emphasis in this specification in order to define the environment in which the present invention operates, and to convey an appreciation of its novel aspects and advantages. The present invention is principally concerned with improvements in the techniques of scrambling and unscrambling as specifically embodied in more detailed aspects of the unscrambler logic 45 (FIG. 2).

In the system in which present invention is embodied, the mode by which the scrambling and unscrambling operations are performed may be varied automatically and rapidly in order to increase the security of the system and to deter unauthorized viewing. In brief, the scrambler-encoder 14 (FIG. 1) encodes into the television signal control signals addressed to a particular unscrambler 17 and directing it to initiate or terminate unscrambling operations, to change the mode of unscrambling, or to tune to a different incoming program. The unscrambler 17 (FIG. 1), and more specifically, the unscrambler logic 45 (FIG. 2), operate to decode the control signal and to perform the appropriate control function if it is addressed to the unscrambler 17 in question. If a subscriber has not paid or been charged for a particular program, the unscrambler 17 will not be directed to unscramble the program, which can be viewed, therefore, only in scrambled form. Since the scrambler-encoder 14 can be controlled to select a scrambling mode which results in extremely disconcerting patterns on the receiver 16, most unauthorized viewers are deterred from viewing a scrambled program. Furthermore, the system has a high degree of security, because the mode of scrambling may be rapidly varied in a practically random fashion.

More specifically, the scrambler-encoder 14 encodes control signals in that portion of the normal composite video and synchronization signal known as the vertical blanking interval. As is well known, a television piture is conventionally made up of a number of horizontal lines traced by an electron beam of varying intensity, usually from the top to the bottom of the picture. A full frame of the picture typically consists of two interlaced fields, each tracking alternate lines in the picture. The composite signal producing the trace of a field of the picture comprises, as can be seen in FIG. 5a, a video signal 71 and a succession of horizontal synchornization pulses 72 used to control transition of the beam from one line to the next. Between successive fields of the picture, there is a vertical blanking interval during which the beam is blanked out and positioned for the start of the next field. The vertical blanking interval conventionally includes a group of equalizing pulses 73, some wider vertical synchronization pulses 74, a further group of equalizing pulses 75, followed finally by a number of horizontal synchronization pulses 76 before the first line of video information in a new field.

Using a widely known technique, the control signals to be transmitted to the unscrambler 17 (FIG. 1) are encoded between the horizontal synchronization pulses 76 which occur towards the end of the vertical blanking interval, as shown at 77. The technique is similar, for example, to one used by television networks for encoding time-of-day signals into the vertical blanking interval. In the presently preferred embodiment, there are three "lines" of control signals, each coded in binary digital form as a series of pulses, and each line of signals being addressed to a particular unscrambler 17 (FIG. 1). They may conveniently be thought of as lines of signals or data, since they appear between horizontal synchronization pulses in much the same way as lines of video information. However, it will be understood that the control signals occur between fields of the picture and are not normally displayed as video signals. In any one vertical blanking interval, control signals may be transmitted to up to three separate unscramblers 17, using all three lines, and, since there are 60 vertical blanking intervals per second in television systems in the United States, up to 180 separate unscramblers may be addressed per second. It will be appreciated that a greater number of receivers can be addressed by using more lines of the vertical blanking interval or encoding control signals for more than one unscrambler in a single line. In the unused line immediately following the control signals, an unscrambler synchronization signal 78 is encoded from time to time. This signal, as will be subsequently discussed in detail, is required to synchronize operations of the scrambler-encoder 14 (FIG. 1) and the unscrambler 17.

The unscrambler logic 45 (FIG. 2) receives the composite video and synchronization signal over the line 46, this signal including the control signals encoded as illustrated and discussed with respect to FIG. 5a. In decoding these control signals, the unscrambler logic 45 utilizes horizontal and vertical synchronization pulses separated from the video signal by the synchronization separator 42 and transferred to the unscrambler logic 45 along the lines 43 and 44 respectively. It will be appreciated from FIG. 5a, that there is no single vertical synchronization pulse as such, but rather a series of pulses during the vertical blanking interval. The vertical synchronization pulse transmitted along the line 44 is termed a "stretched" vertical synchronization pulse and is developed in the synchornization separator 42, and illustrated in FIG. 5b. It will be seen that the stretched vertical synchronization pulse begins fter the first group of equalizing pulses 73 in the vertical blanking interval, and ends after the final group of qualizing pulses 75 and immediately before resumption of the normally spaced horizontal synchronization ulses 76.

As will be seen, the stretched vertical synchronization pulse 79 is utilized in the unscrambler logic 45 in the decoding of the control signals 77 (FIG. 5a) and the unscrambler synchronization signals 78. It should further be noted that the horizontal synchronization signal enveloped in the synchronization separator 42 (FIG. ), and transmitted to the unscrambler logic 45 along the line 43, is also a stretched horizontal synchronization pulse, including the so-called "front porch" and "back porch" portions of the conventional horizontal synchronization pulse, as well as a color burst signal included in color television transmissions.

The unscrambler logic 45 (FIG. 2) will now be described in greater detail with reference to FIG. 3. Basically, the logic illustrated in FIG. 3 operates to receive control signals encoded in the composite video and synchronization signal, at the terminal 85, to decode those control signal, utilizing the stretched vertical synchronization pulse input at 86 and the stretched horizontal synchronization pulse input at 87, and, if the control signals are addressed to the unscrambler in question, to place the decoded control signals in a control register 88. A scramble decoder 89, which will be discussed in greater detail with reference to FIGS. 7 and 8, then uses the contents of the control register 88, along with other available signals, to generate the "invert" or "non-invert" signal, as shown at 91. This signal and its inverse, produced by an inverter 90, are the signals transmitted over the lines 47 and 48, respectively, in FIG. 2, and as will be recalled from the description of FIG. 2, these signals are used to control the gating circuits 38 and 39 (FIG. 2) and thereby to unscramble the scrambled video signals.

More specifically, the stretched horizontal synchronization pulses input at 87 are fed to a horizontal synchronization pulse counter 92, which is a conventional, multi-stage, binary counter, arranged to have all of its stages reset to zero by a falling vertical synchronization pulse as introduced over line 93. The horizontal synchronization pulse counter 92 has the states of its various stages connected, as shown by line 94, to a horizontal synchronization count decoder 95, which uses conventional logic to compare the current setting of the horizontal synchronization pulse counter with a range of consecutive numbers designated $m$ through $m+n-1$), and to generate an equality signal, as shown in line 96 if the current value of the count falls within that range.

It will be recalled from FIG. 5a that the control signals 77 are encoded between the horizontal synchronization pulses 76 towards the end of the blanking interval. When the stretched vertical synchronization pulse 79 (FIG. 5b) falls, this resets the horizontal synchronization pulse counter 92 (FIG. 3), which then begins to count the immediately following horizontal synchronization pulses 76 (FIG. 5a).

In general, the control signals may be encoded after any of the horizontal synchronization pulses 76 in the vertical blanking interval, but it is here assumed that they are encoded beginning after the mth horizontal synchronization pulse following the falling of the stretched vertical synchronization pulse 79 (FIG. 5b) and that the control signals and unscrambler synchronization signal occupy n consecutive lines in the vertical blanking interval. The horizontal synchronization count decoder 95 operates to recognize those of the horizontal synchronization pulses 76 (FIG. 5a) which precede each line of control signals 77 or the unscrambler synchronization signal 78.

The equality signal generated by the horizontal synchronization count decoder 95 is connected to a conventional gate circuit, the horizontal synchronization pulse gate 97, into which the stretched horizontal synchronization pulses introduced at 87 are also input over line 98. The gate 97 will, therefore, pass only those horizontal synchronization pulses numbered m through $m+n-1$, i.e., those immediately preceding each line of the control signals 77 and the unscrambler synchronization signal 78 (FIG. 5a). These synchronization pulses are connected along line 99 to the set terminal of a data clock flip-flop 101, the 1 output of which is connected by line 102 to a clock gate 103.

An eight-megahertz clock 104 is also connected to the clock gate 103, as shown by line 105, and the output of the clock gate is connected by line 106 to a data clock circuit 107, the function of which will shortly become clear.

It will be seen that the logic as thus far described operates to set the data clock flip-flop 101 whenever one of the horizontal synchronization pulses preceding a line of control signals encoded in the vertical blanking interval is encountered, and that the data clock flip-flop is in turn used to gate the operation of the eight-megahertz clock 104. FIGS. 6a–e illustrate the timing relationships involved in the logic described thus far. FIG. 6a merely shows the eight-megahertz clock pulses, while FIG. 6b shows a series of horizontal synchronization pulses 76, the mth pulse being shown as 76m. FIG. 6c illustrates the condition of the data clock flip-flop 101, and it will be noted that the flip-flop is set on the occurrence of the mth horizontal synchronization pulse 76m, as shown at 108, and is also set on the occurrence of the next subsequent horizontal synchronization pulse, as shown at 109. FIG. 6e represents, on the same time scale, the location of the control signals encoded after the mth horizontal synchronization pulse.

In the presently preferred embodiment, the control signals are coded as binary pulses one microsecond in width. The function of the one-megahertz data clock 107 (FIG. 3) is to drive from the eight-megahertz clock 104 (FIG. 3) a sequence of clock pulses spaced by one microsecond, as shown in FIG. 6d. It is a further function of the one-megahertz data clock 107 (FIG. 3) to use a center sampling technique with respect to the encoded control signals, i.e., the one-megahertz clock pulses shown in FIG. 6d are approximately centered with respect to corresponding binary pulses comprising the encoded control signals. The one-megahertz data clock 107 (FIG. 3) achieves these functions using conventional digital logic to count the eight-megahertz clock pulses received over the line 106 and to generate an output clock pulse on the line 111 on the occurrence of the fourth incoming clock pulse, and every eighth clock pulse thereafter until the clock gate 103 is turned off.

The clock pulses from the one-megahertz data clock 107 are transmitted to a data signal gate 112 over line 113, and there used to clock the encoded control signals input at 85 into a conventional serial shift register 114. The clock signals from the one-megahertz data clock 107 are also directed to a data bit counter 115 over line 116, the counter being connected to generate a signal on line 117 when all bits of one line of the control signals have been clocked into the serial shift register 114. At this point, the serial shift register 114 contains the control signals that were encoded in one line of the vertical blanking interval. The signal on the line 117 indicating that all bits of the control signals have been decoded is connected by line 118 to the "clear" terminal of the data clock flip-flop 101. Thus, when all the data in a particular line has been decoded, the data clock flip-flop 101 is cleared to a zero condition, the clock gate 103 is thereby closed, and no further clock pulses are generated by the one-megahertz data clock 107. When the next horizontal synchronization pulse appears on the line 99, however, the data clock flip-flop 101 is set again, and the whole operation is repeated to clock another line of control signals into the serial shift register 114.

The signal on the line 117 indicating that the serial shift register 114 contains a full set of data, is also utilized to initiate operation of an address comparator 119, as shown by the line 120. The address comparator 119 uses conventional digital techniques to compare the setting of an identifier field, transmitted with the control signals and now in the serial shift register 114, with a unique address assigned to this particular unscrambler. If the comparison is unsuccessful, the control signals in the serial shift register 114 were not addressed to this particular unscrambler, and no further action is taken. In this event, the contents of the serial shift register 114 are lost after the next horizontal synchronization pulse initiating clocking of further control signals into the serial shift register. If, on the other hand, the address comparator 119 successfully matches the identifier field in the serial shift register 114 with the unique identifier of this particular unscrambler, then a control signal is generated on line 121 from the address comparator, and the contents of the serial shift register 114, excluding the identifier field, are gated over line 122 to the control register 88. The address comparator 119 also compares the identifier field in the serial shift register 114 with a special "all-call" identifier used to address all unscramblers in the system, and if a match is found, a control signal is generated on line 121 and the control register 88 receives new data over line 122. By means of this feature, all unscramblers in the system can be enabled or disabled with one control signal transmission.

The contents of the control register 88 include an "unscramble on" or "off" signal which is transferred to the scramble decoder 89 over line 123, to initiate or terminate unscrambling operations, and a mode select field which is also transmitted to the scramble decoder, over line 124, to select the mode according to which unscrambling is to be performed. The control register 88 may also contain a channel select field, as indicated at 125, and this may be connected to the channel selector 28 (FIG. 2) for the purpose of channel selection by remote control from the central computer 18 (FIG. 1), as shown by the dotted line 126 in FIG. 2.

To complete the description of operation of this portion of the unscrambler logic in FIG. 3, it should also be noted that the one-megahertz data clock 107 and the data bit counter 115 are reset to a zero condition when the data clock flip-flop 101 is set to a 1 condition by an incoming horizontal synchronization pulse. Thus, each horizontal synchronization pulse initiates a new sequence of clocking and counting incoming control signals.

In general, the contents of the serial shift register 114 (FIG. 3) is volatile, and is of no interest unless the address comparator 119 determines that the control signals are intended for the particular unscrambler. However, there are two important exceptions to this.

The first exception involves decoding of the unscrambler synchronization pulse 78 (FIG. 5a), which is encoded in the last or $n$th line to be decoded in the vertical blanking interval. Only a single bit of information is needed for encoding the pulse, and the identifier field is meaningless in this nth line. To decode the unscrambler synchronization pulse, a line n indicator 128 or flip-flop is set only on the occurrence of the $n$th horizontal synchronization pulse gated by the horizontal synchronization pulse gate 97, as indicated by the line 129. This indicator 128 is used to gate, as shown by line 131, the unscrambler synchronization pulse from the serial shift register 114 into an unscrambler synchronization indicator 132, along the line 133. This unscrambler synchronization indicator 132 is another flip-flop, the output of which is connected to the scramble decoder 89, over line 134, and is used to synchronize unscrambling and scrambling operations.

It should also be noted that gating of the unscrambler synchronization pulse from the serial shift register 114 into the unscrambler synchronization indicator 132 is controlled in part by the control signal from the data bit counter 115 indicating that all data bits of a line of control signals have been shifted into the serial shift register 114. This is indicated by the line 135. Thus, the unscrambler synchronization pulse is gated into the unscrambler synchronization indicator 132 only when the line n indicator 128 is set and the unscrambler synchronization pulse has been shifted into its correct position in the serial shift register 114.

The other case where the control register 88 is bypassed and information is taken directly from the serial shift register 114 involves another use of the last or nth encoded line of control signals, to contain mode selection information not intended for a particular unscrambler. Instead, this mode selection information is directed to all unscramblers which have previously been enabled by appropriately addressed control signals. In one of the alternative embodiments of the scrambler decoder 89 to be described, this technique is utilized, and new mode selection information may be passed to the scrambler decoder 89 during every vertical blanking interval if this is desired. This information will, of course, have no effect on unscramblers which have not been previously specifically addressed with an unscamble on control signal to initiate unscrambling.

The aforementioned tenchique wherein mode selection information is gated from the serial shift register 114 directly to the scramble decoder 89 is shown for clarity as a single broken line 136 in FIG. 3. However, it will be appreciated that the mode select signals are gated along the line 136 only when the nth line is detected and only when the data bit counter 115 detects that the entire line of data has been decoded. The logic for making these determinations is similar to that described above with respect to decoding unscrambler synchronization pulses from the $n$th line.

The scramble decoder 89 also has available as inputs the stretched horizontal synchronization pulses, along line 137, and the signal from the data bit counter 115 indicating that all control signal bits of a line have been entered into the serial shift reigister 114, as indicated by line 138. How these signals are utilized in the scramble decoder 89 is discussed below with respect to FIGS. 7 and 8.

In summary, the logic illustrated in FIG. 3 operates to decode control signals encoded in the vertical blanking interval of the composite of video and synchronization signal, compares the address or identifier contained in the encoded control signals with the unique address of the particular unscrambler, and if a match is found, stores the control signals in the control register 88 for subsequent use by the scramble decoder 89. For the last or $n$th line of control signals decoded, there is no identifier encoded in the incoming signals, but there may still be control information contained in the serial shift register 114, and this is conveyed directly to the scramble decoder 89, where it will be of significance only if a previous control signal has been received to enable the particular unscrambler.

The scramble decoder 89 (FIG. 3) is illustrated in detail in FIG. 7. The embodiment includes a scramble mode holding register 161, a scramble mode accumulator 162, accumulator scrambler logic 163, a scramble clock pulse generator 164, a decoder 165, and an AND gate 144.

When all the encoded control signals in a line have been clocked into the serial shift register 114 (FIG. 3), a control signal from the data bit counter 115 (FIG. 3) is transmitted to the scramble mode holding register 161 (FIG. 7) over the line 138, and is used to gate the mode select field from the serial shift register 114 (FIG. 3) into the scramble mode holding register 161 (FIG. 7). The scramble mode holding register 161 holds the current mode of scrambling or unscrambling until a new one is received during a subsequent vertical blanking interval. When an unscrambler synchronization pulse 78 (FIG. 5a) is received, it is applied as indicated, over the line 134, to gate the contents of the scramble mode register 161 into the scramble mode accumulator 162. The scramble clock pulse generator 164 is disabled by the stretched horizontal synchronization pusles, as shown at 166, and outputs clock pulses only between stretched horizontal synchronization pulses, over line 167, to the scramble mode accumulator 162. The accumulator 162 is a conventional shift register and the effect of the scramble clock pulses from the pulse generator 164 is to shift the contents of the accumulator one bit position at a time and to enable the accumulator scrambler logic 163. As will be seen, the accumulator scrambler logic 163 operates to drive a single-bit signal from the current contents of the accumulator 162. More specifically, each clock pulse on the line 167 generates a single-bit shift signal with the current contents of the accumulator 162, and shifts a single bit into one end of the accumulator. Each clock pulse also shifts the contents of the accumulator 162 into the accumulator scrambler logic 163. A single bit from the accumulator scrambler logic 163 is output to the accumulator 162, over line 168, simultaneously with the accumulator shift, and a bit at the other end of the accumulator is "shifted out" and lost.

The stretched horizontal synchronization pulses are also applied to the decoder 165 over line 169, to trigger operation of the decoder and thereby to derive an invert or non-invert signal from the current contents of the accumulator 162. In the presently preferred version of this embodiment, the decoder 165 is merely a flip-flop connected so that a horizontal synchronization pulse on the line 169 gates one digit of the accumulator 162 into the decoder flip-flop 165. The output condition of the decoder 165 is connected as an input to the AND gate 144, as shown by the line 171, 171. Also input to the AND gate 144 are the stretched horizontal synchronization signal on line 137, which is inverted before input to the AND gate, and the unscramble on/off signal on line 123. The AND gate 144 ensures that the video signal is inverted only between, but not during, the occurrences of stretched horizontal synchronization pusles, and only when the unscramble on/off signal is in the on condition.

In operation, the contents of the accumulator 162 are themselves scrambled by the application of clock pulses from the scramble clock pulse generator 164, which have the effect of shifting the accumulator one bit position at a time and shifting a one-bit signal into the end of the accumulator, the signal being generated by the accumulator scrambler logic 163, which in turn, derives the one-bit signal from the previously current contents of the accumulator. The invert or non-invert signal at the output 91 of the AND gate 144 is thus varied in a manner dependent on the accumulator scrambler logic 163, which may be any desired logical arrangement designed to produce a pre-determined sequence of invert or non-invert signals.

An elementary example of the accumulator scrambler logic 162 (FIG. 7) is presented in FIG. 8, in which the scramble mode accumulator is shown as a four-bit shift register, with bits numbered zero through three, and in which the accumulator scrambler logic comprises three exclusive OR gates 173, 174 and 175, and a flip-flop 176. In the illustrative logic of FIG. 8, the odd numbered bits of the accumulator 162 are connected as inputs to exclusive OR gate 173, the even numbered bits are connected as inputs to the exclusive OR gate 174, and the outputs of the exclusive OR gates 173 and 174 are connected as inputs to the exclusive OR gate 175. The output of the exclusive OR gate 175 is appropriately gated to the flip-flop 176, which is used to temporarily store the one-bit signal derived by the exclusive OR gates 173-175. On each clock pulse from the scramble clock pulse generator 164, a new one-bit result is gated into the flip-flop 176, the one-bit signal previously stored there is gated into the zero-numbered bit position of the accumulator 162, and the contents of the accumulator are shifted one bit position to the right, bit number three being lost. It will be appreciated that connections for various timing signals have been omitted for clarity from FIG. 8, as well as from certain portions of the other figures, but that those of ordinary skill in the art will have little difficulty in supplying the necessary timing circuitry, all of which is conventional and well known.

It should be emphasized that the accumulator scrambler logic 163 (FIG. 7) can be designed to produce any desired pattern of inverting and non-inverting signals for application to scrambling or unscrambling circuits, and that it may even be designed to produce a one-bit result in a random,, yet predictable fashion. Apparent randomness of the mode of scrambling results in a highly secure system, but the randomness is still predictable in the sense that a similar accumulator scrambler logic element is operating in the scramblerencoder 14 (FIG. 1) in synchronism with the accumulator scrambler logic 163 in FIG. 7.

It will be appreciated from the foregoing that the present invention significantly advances the state of the art of scrambling and unscrambling television signals, specifically in the field of subscription television systems. In particular, the invention can operate to vary the scrambling mode rapidly and automatically, and in an apparently random fashion. This greatly increases the security of the system from unauthorized unscrambling of signals intended only for certain subscribers, and allows the scrambling mode to be selected and varied so as to deter most unauthorized viewers from watching the scrambled video patterns.

While a particular embodiment of the invention has been illustrated and described in detail, it will be appreciated that various modifications can be made without departing from the spirit and scope of the invention. Accordingly, the invention is not to be limited, except as by the appended claims.

We claim:

1. For use with receivers in a subscription television system, a method of unscrambling television video signals scrambled by inversion of portions corresponding to preselected lines in a television picture, comprising the steps of:
receiving and decoding unscrambler mode selection signals encoded from time to time in vertical blanking intervals of the video signals;
storing said unscrambler mode selection signals in register means; and
selectively inverting the video signals in accordance with a mode determined by the unscrambler mode selection signals, said step of selectively inverting including
scrambling the signals stored in the register means according to a predetermined pattern,
deriving an inversion indicator signal from the scrambled stored signals, and
inverting the video signals only when the inversion control signal is in a particular state.

2. A method as set forth in claim 1, wherein the register means includes shift register means having a plurality of digits, and each step of scrambling the signals stored in the register means includes:
periodically shifting the signals in the shift register means a predetermined number of times between successive horizontal synchronization pulses separating the lines;
logically generating a digit from the plurality of digits in the shift register means; and
gating the generated digit into the shift register means during each of said shifting steps.

3. A method as set forth in claim 2, wherein said step of logically generating a digit includes performing successive exclusive OR functions on the plurality of digits to obtain a single-digit result.

4. A method as set forth in claim 2, wherein said step of deriving an inversion indicator signal is effected by sensing a particular digit in the shift register means.

5. A method as set forth in claim 2, and further including:
receiving and decoding unscrambler synchronization signals encoded from time to time in vertical blanking intervals of the video signals; and
resetting the shift register means to a starting value on receipt of each unscrambler synchronization signal, thereby synchronizing said step of selectively inverting with a corresponding inverting step performed in scrambling of the video signals.

6. A method as set forth in claim 1, wherein said step of selectively inverting includes generating an inversion control signal from the inversion indicator signal and from a horizontal synchronization pulse signal, whereby inversion is performed only between successive horizontal synchronization pulses and only when the inversion indicator signal is in the particular state indicating inversion.

7. For use with receivers in a subscription television system, apparatus for unscrambling television video signals scrambled by inversion of portions corresponding to preselected lines in a television picture, said apparatus comprising:
means for receiving and decoding unscrambler mode selection signals;
register means for storing said unscrambler mode selection signals; and
means for selectively inverting said video signals according to a mode determined by said unscrambler mode selection signals, and including
means for scrambling the signals stored in said register means according to a predetermined pattern,
means for deriving an inversion indicator signal from the scrambled stored signals, and
means for inverting the video signals only when said inversion indicator signal is in a particular state.

8. Apparatus as set forth in claim 7, wherein said register means includes shift register means having a plurality of digits, and said means for scrambling the signals stored in said register means include:
means for shifting the signals in said register means a predetermined number of times between successive horizontal synchronization pulses separating the lines;
logic means for generating a digit from the plurality of digits in said shift register means; and
means for shifting said generated digit into said shift register means each time said stored signals in said shift register means are shifted by said means for shifting.

9. Apparatus as set forth in claim 8, wherein said logic means for generating a digit includes exclusive OR gate means connected to said plurality of digits to obtain a single-digit result.

10. Apparatus as set forth in claim 8, wherein said means for deriving said inversion indicator signal includes means for gating a particular digit from said shift register means.

11. Apparatus as set forth in claim 8, and further including means for receiving and decoding an unscrambler synchronization signal; and
means for resetting said shift register means to a starting value on receipt of said unscrambler synchronization signal, thereby synchronizing said means for selectively inverting with corresponding means used in scrambling the video signals.

* * * * *